United States Patent
Boukobza

(10) Patent No.: US 8,424,709 B2
(45) Date of Patent: Apr. 23, 2013

(54) BOTTOM OF A MOLD FOR PRODUCING THERMOPLASTIC CONTAINERS, AND CONTAINER OBTAINED

(75) Inventor: Michel Boukobza, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 341 days.

(21) Appl. No.: 12/812,180

(22) PCT Filed: Jan. 8, 2009

(86) PCT No.: PCT/FR2009/050018
§ 371 (c)(1),
(2), (4) Date: Jul. 8, 2010

(87) PCT Pub. No.: WO2009/092936
PCT Pub. Date: Jul. 30, 2009

(65) Prior Publication Data
US 2010/0285256 A1   Nov. 11, 2010

(30) Foreign Application Priority Data
Jan. 9, 2008   (FR) ................................. 08 50095

(51) Int. Cl.
*B65D 6/28* (2006.01)
*B65D 8/04* (2006.01)
*B29C 49/00* (2006.01)

(52) U.S. Cl.
USPC ........... 220/675; 215/371; 215/374; 215/382; 220/604; 220/608; 220/669; 425/522

(58) Field of Classification Search ............. 215/371, 215/374, 382, 384; 220/604, 608, 669, 675; 425/522; 428/36.92
See application file for complete search history.

(56) References Cited

U.S. PATENT DOCUMENTS 3,659,741 A * 5/1972 Corelli .................... 220/592.01
4,311,246 A   1/1982 Saito et al.
(Continued)

FOREIGN PATENT DOCUMENTS

EP    1 471 010 A1   10/2004
FR    1 436 030 A     6/1966
(Continued)

OTHER PUBLICATIONS

French Preliminary Search Report dated Oct. 8, 2008.
International Search Report dated Jun. 25, 2009.

*Primary Examiner* — Anthony Stashick
*Assistant Examiner* — Madison L Poos
(74) *Attorney, Agent, or Firm* — Sughrue Mion, PLLC

(57) ABSTRACT

The invention relates to a bottom of a mould for producing thermoplastic containers, and to a container thus produced. The container (1) produced comprises: a base (4) having a concave peripheral wall (6) extending essentially coaxially to the X-X' axis, this concavity defining a non null curvature all along the wall (6); an annular region (7) forming a tubular peripheral wall (8) extending essentially coaxially to the X-X' axis, the transversal radial distance between the X-X' axis and said wall (8) being longer than the transversal radial distance between the X-X' axis and any point along the concave peripheral wall (6) of said base (4); and a shoulder (9) forming a connecting region between the base (4) and the annular region (7). The depth of said annular region is between 0.5 and 2%, preferably between 1 and 1.5%, especially 1.2% of the diameter of the annular region (7), and the height of the base (4) is between 5 and 15 mm.

18 Claims, 2 Drawing Sheets

U.S. PATENT DOCUMENTS

| | | | |
|---|---|---|---|
| 4,439,393 A | 3/1984 | Saito et al. | |
| 6,659,298 B2 | 12/2003 | Wong | |
| 7,556,164 B2 | 7/2009 | Tanaka et al. | |
| 7,563,089 B2 | 7/2009 | Dannebey et al. | |
| 2003/0042221 A1 | 3/2003 | Wong | |
| 2004/0251258 A1 | 12/2004 | Akiyama et al. | |
| 2005/0082250 A1 | 4/2005 | Tanaka et al. | |
| 2009/0263534 A1 | 10/2009 | Lesueur | |
| 2010/0047375 A1 | 2/2010 | Rousseau et al. | |

FOREIGN PATENT DOCUMENTS

| | | |
|---|---|---|
| FR | 2 883 794 A1 | 10/2006 |
| FR | 2 892 048 A1 | 4/2007 |
| FR | 2 912 952 A1 | 8/2008 |
| GB | 2 041 286 A | 9/1980 |
| GB | 2 379 206 A | 3/2003 |
| JP | 10-139029 A | 5/1998 |
| JP | 2002-332022 A | 11/2002 |
| WO | 98/29314 A1 | 7/1998 |

* cited by examiner

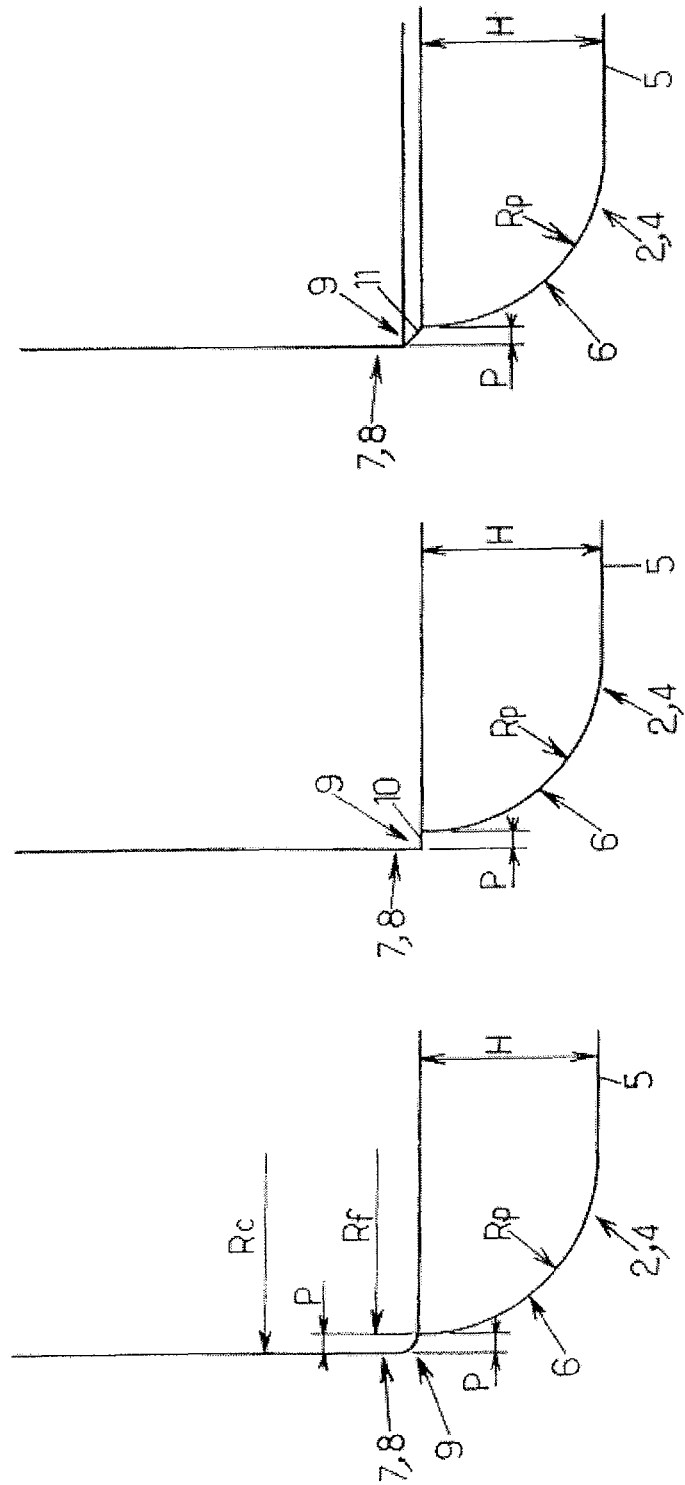

BOTTOM OF A MOLD FOR PRODUCING THERMOPLASTIC CONTAINERS, AND CONTAINER OBTAINED

This invention relates in general to the production, by blow molding or stretch-blow molding, of containers, particularly bottles, of thermoplastic material such as PET (polyethylene terephthalate), by blow molding or stretch-blow molding preforms.

More specifically, the invention relates to improvements made to the bottoms of containers and to their production molds, and in particular to the mold bottoms.

BACKGROUND OF THE INVENTION

The production of containers of thermoplastic material is generally relatively complex, and the container bottom is one of the parts requiring the most attention. It is the container bottom which supports the weight of the column of liquid contained in the container, and if it has insufficient mechanical strength, it loses its shape and the container can no longer rest in a stable manner on a flat support.

The container bottom is therefore the part of the container which it is particularly important to blow mold or stretch-blow mold into the correct shape, but it is a difficult part to shape because the thickness of the thermoplastic material in the bottom of the preform is substantially greater than elsewhere, which results in slower stretching and more difficulty with properly forming this container bottom.

Improper distribution of material at the container bottom can affect the stability of the container. Such improper distribution can occur in the central portion of the bottom and/or in the peripheral wall, which could modify the position and/or slope of the container base, and the container may no longer rest in a stable manner on a flat support.

To improve its mechanical strength, the bottom conventionally has a complex or highly complex shape, with many raised or sunken areas which when properly formed are supposed to provide the desired mechanical strength.

At any location on the bottom, the mechanical strength must be sufficient to prevent the bottom collapsing from the weight of the liquid and the internal pressure (as this type of container is often used to contain carbonated liquids).

Document US 2004/0251258, for example, shows several container models which have a relatively complex bottom; this bottom comprises several distinct regions of different diameters with radii of curvature that also change from one zone to another, forming a tiered bottom. The diameter of the supporting base of the bottle is relatively modest compared to the diameter of the container body, and above the part encircling this supporting base is a second level which is bowl-shaped and reinforced with vertical ribs to improve its strength.

The complex form of the containers, and particularly their bottom, requires accurate and careful control of the blowing conditions, particularly the blowing pressure, if properly made containers are to result.

The forming and shaping of the material in the bottom region are currently obtained by blowing under high pressure (typically on the order of $40 \times 10^5$ Pa), which allows combining such forming and shaping at high production speeds of several thousand containers per hour.

However, producing a blown fluid (generally air) at such a high pressure is very costly in terms of the materials and electricity used, and manufacturers want to cut costs at this station by using lower pressures and therefore less costly materials. In addition, it is difficult to conceive of an increase in the production speeds under current manufacturing conditions.

One should also stress the sometimes complex path followed by the material as it passes from its initial shape (preform) to that of the mold wall which corresponds to an impression of the final container; said impression can force this material, especially at the bottom of said container, into a path with changes in direction or even points of inflection, and these changes in direction can correspond to changes in angle of up to 90° or more.

This, together with the significant thickness of the material in this bottom region of the preform, can lead to insufficient coating of the material on the wall of the mold cavity and improper cooling of the material against the mold; a reduction in the quality of all or part of the container bottom may result. In addition, this travel of the material from the preform to the mold wall requires a certain amount of time.

Manufacturers of containers of thermoplastic material are always seeking to improve the economic conditions of production, by attempting to produce containers requiring a smaller amount of thermoplastic material, at a substantially lower blowing pressure if possible (likely to result in insufficient coating of the mold cavity) and especially at increasingly greater production speeds (requiring faster displacement of the material during molding).

The most difficult parts to blow mold are the parts which are at the greatest distance from the central axis of the mold bottom.

This difficulty is even more pronounced when there are regions of the mold bottom where the blown material is likely to accumulate; such accumulation can prevent the material from flowing freely and coating the entire mold bottom.

Such is the case when a rib is added to the mold bottom to reinforce the radial rigidity of the container bottom. This solution results in difficulties in coating the rib with blown material and can block the flow of blown material.

Such problems can occur with containers such as those described in the documents FR 2 892 048 and GB 2 041 286. In addition, in the case of document GB 2 041 286, it should be noted that the presence of a flange destabilizes the bottles during handling and particularly during conveyance; the containers have a tendency to jam together and climb one other, which adversely impacts their stability.

Therefore no solutions exist in the prior art which allow proper molding of a container bottom with reinforced radial rigidity while facilitating such molding by blowing or stretch-blowing an appropriate preform. The invention proposes a solution to these problems.

SUMMARY OF THE INVENTION

A first aspect of the invention concerns a container obtained by stretch-blow molding a preform of thermoplastic material, said container in particular having a bottom onto which is mounted a tubular body, and comprising:
- a base having a central portion and a concave peripheral wall with a concavity oriented towards the interior of said container, said concave peripheral wall extending substantially coaxially to the axis of said container, and said concavity defining a non-zero curvature at all points along said concave peripheral wall,
- an annular region situated above said base, forming a tubular peripheral wall, and
- a shoulder forming a connecting region between said base and said annular region, said annular region being situated in an extension of the lower portion, at least, of said tubular body, and the radial distance between said axis of said container and said tubular peripheral wall of said annular region is greater than the radial distance between said axis of said container and any point on said concave peripheral wall of said base.

In an advantageous embodiment, the shoulder has a concavity defining a non-zero curvature at all points along its profile.

Still in an advantageous embodiment, the shoulder comprises at least one substantially rectilinear wall transverse to the axis of the container as well as at least one substantially rectilinear wall parallel to the axis of said container.

In another advantageous embodiment, the shoulder comprises at least one wall that is inclined relative to the axis of the container.

Still according to the invention, the depth of the shoulder is on the order of 0.5 to 2%, preferably 1 to 1.5% and in particular 1.2%, of the diameter of the annular region.

In another arrangement of the invention, the depth of the shoulder is between 0.5 and 2.5 mm for a container for which the diameter of the lower portion of the tubular body is between 50 and 120 mm.

Still according to the invention, the mean radius of curvature of the concave peripheral wall of the base is between 5 and 20 mm.

In another arrangement of the invention, the radius of curvature of the concave peripheral wall of the base is variable between the central portion of said base and the shoulder.

Still according to the invention, the height of the concave peripheral wall of the base is between 5 and 15 mm.

The invention also relates to the mold for obtaining this type of container and especially to the bottom which, in cooperation and/or with the two mold halves, comprises the impression of said container described above, said mold having an impression that comprises, under its tubular portion which corresponds to the tubular body of said container: —a base having a central portion and a concave peripheral wall with its concavity oriented towards the interior of said mold, said wall extending substantially coaxially to the axis of said mold, and said concavity defining a non-zero curvature at all points along said concave peripheral wall, an annular region situated above said base, forming a tubular peripheral wall, and a shoulder forming a connecting region between said base and said annular region, said annular region being situated in an extension of at least the tubular lower portion of said mold, and the radial distance between the axis of said mold and said tubular peripheral wall is greater than the radial distance between said axis and any point on said concave peripheral wall of said base.

In an advantageous embodiment, the impression for the shoulder has a concavity defining a non-zero curvature at all points along its profile.

Still in an advantageous embodiment, the impression for the shoulder comprises at least one substantially rectilinear wall transverse to the axis of the mold, as well as at least one substantially rectilinear wall parallel to said axis.

In another advantageous embodiment, the impression of the shoulder comprises at least one wall that is inclined relative to the axis of the mold.

Still according to the invention, the depth of the impression for the shoulder is on the order of 0.5 to 2%, preferably 1 to 1.5% and particularly 1.2%, of the diameter of the annular region.

In another arrangement of the invention, the depth of the impression for the shoulder is between 0.5 and 2.5 mm for a mold in which the inside diameter of the lower portion of the body is between 50 and 120 mm.

Still according to the invention, the mean radius of curvature of the concave peripheral wall of the base is between 5 and 20 mm.

In another arrangement of the invention, the radius of curvature of the concave peripheral wall of the base is variable between the central portion of said base and the shoulder.

Still according to the invention, the height of the peripheral wall of the base is between 5 and 15 mm.

BRIEF DESCRIPTION OF THE DRAWINGS

The invention is now described by means of an example provided for illustrative purposes only and which is in no way limiting, as well as the attached drawings in which:

FIG. 2 is an enlarged view of the container bottom and of the profile of the corresponding cavity shaped in the mold, according to a first embodiment of the invention, FIG. 3 is an enlarged view of the peripheral region of the container bottom and the profile of the corresponding mold cavity, according to a second embodiment of the invention, and FIG. 4 is an enlarged view of the peripheral region of the container bottom and the profile of the corresponding mold cavity, according to a third embodiment of the invention.

DETAILED DESCRIPTION OF THE PRESENTLY PREFERRED EMBODIMENTS

Figure 1:
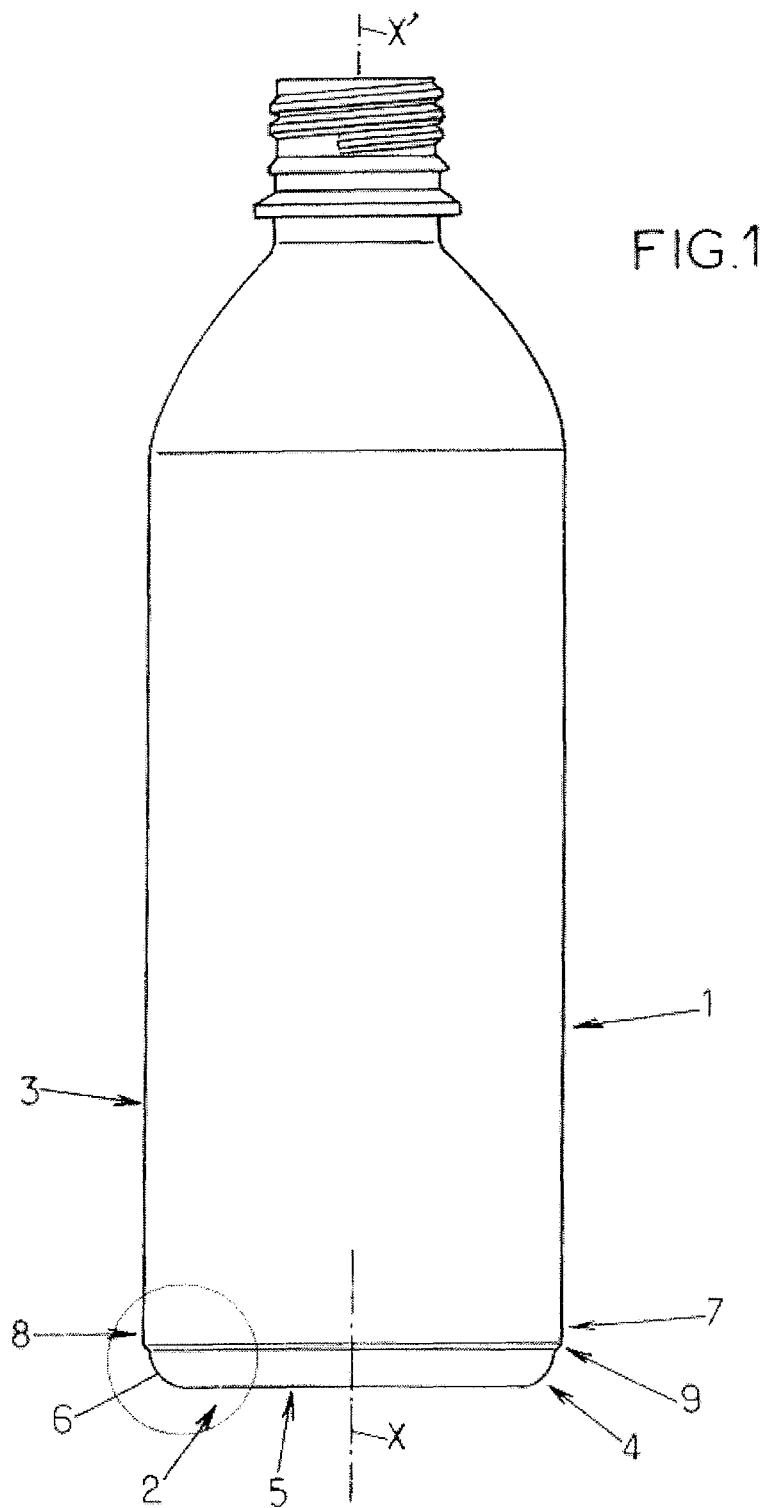
FIG. 1 represents a sectional view of a container according to the invention, of the type obtained using a mold comprising a bottom associated with two mold halves.

FIGS. 1 and 2 illustrate a general view of a container 1 in the form of a bottle, with contours corresponding to the profile of the mold cavity used to shape it by blow molding or stretch-blow molding a preform, not represented, of thermoplastic material such as PET.

This container 1 comprises a bottom 2 onto which is mounted onto a tubular body 3, the whole being centered around an axis X-X'. The forming of this container 1 requires a mold, not represented, which conventionally comprises two mold halves and a bottom, as described in documents FR 2 912 952 and FR 2 883 794 for example.

The bottom 2 of the container 1 comprises a base 4 which is composed of a central portion 5 and a concave peripheral wall 6, both being substantially coaxial to the axis X-X' of said container 1. The concavity of the wall 6 is oriented towards the inside of the container 1 and this concavity defines a non-zero curvature at all points along said wall 6, meaning that no rectilinear region exists on this wall 6.

The central portion 5 of the base 4 can be either completely smooth or can have any appropriate form.

The bottom 2 of the container 1 also comprises an annular region 7 which constitutes the lower portion of a tubular peripheral wall 8 of the body 3, substantially coaxial to the axis X-X'. The transverse radial distance between the axis X-X' of the container and the tubular peripheral wall 8 of the annular region 7 is greater than the transverse radial distance which exists between the axis X-X' and any point along the concave peripheral wall 6 of the base 4.

The bottom 2 of the container 1 also comprises a shoulder 9 which forms a connecting region between the base 4 and the annular region 7. In other words, the shoulder 9 is at the end of the curvature (or of a curved portion) of the base 4, such that this base has no rectilinear region which is substantially parallel to the axis X-X' of the container 1.

This arrangement provides a container bottom 2 of reinforced radial rigidity and which also has better vertical load resistance, and this arrangement is obtained without interfering with the flow of the preform material which is blown into the appropriate mold during the stretch-blow molding operation.

In the embodiment represented in FIG. 2, the shoulder 9 has a concavity which defines a non-zero curvature at all points along its profile. The concave peripheral wall 6 of the base 4 on the one hand, and the shoulder 9 on the other hand, do not form any region with a substantially rectilinear profile, meaning of zero or infinite curvature, coaxial or transverse to the axis X-X' of the container; this shoulder 9 defines a generally concave region, oriented towards the interior of the container and into which the blown thermoplastic material of the preform is able to flow, without encountering any area likely to cause an accumulation of the blown thermoplastic material.

Preferably, in this embodiment, the curvature defined by the concavity of the shoulder 9 is smaller than the curvature defined by the profile of the concave peripheral wall 6 of the base 4.

In an alternative embodiment, as illustrated in FIG. 3, the shoulder 9 is in the form of a step, and comprises a substantially rectilinear wall 10 transverse to the axis X-X' of the container, with said wall 10 extending between the concave peripheral wall 6 of the base 4 and the tubular peripheral wall 8 of this same base.

The tubular peripheral wall 8 corresponds to at least the lower portion of the tubular body 3 of the container 1, meaning that this wall is situated in an extension of at least the lower portion of said body 3.

However, the lower portion of the tubular body 3 of the container 1 may not strictly be the same as the tubular peripheral wall 8. It is thus possible for this tubular peripheral wall 8 of the annular region 7 to be situated at a transverse radial distance that is slightly less than or greater than (for example, on the order of a millimeter or even a tenth of a millimeter) the transverse radial distance of the wall of the tubular body 3.

In another alternative embodiment, as illustrated in FIG. 4, the shoulder 9 comprises a wall 11 that is inclined relative to the axis X-X' of the container 1. As an example, the inclined wall 11 is at an angle that can vary from an angle of zero slope (in this case the shoulder 9 is of the form illustrated in FIG. 3) to an angle with a maximum slope of, for example, about 45 degrees (in this case the shoulder is of the form illustrated in FIG. 4).

It is also possible to have an embodiment of the shoulder 9 combining both the embodiment illustrated in FIG. 3 and the one illustrated in FIG. 4, meaning a shoulder 9 that first has a substantially rectilinear wall transverse to the axis X-X', then one or more inclined walls, to end at the tubular peripheral wall 8 which is centered around said axis X-X'. The shoulder 9 can therefore be in the form of a plurality of intersections of sharp angles or slopes.

The depth P of the shoulder 9, meaning the transverse radial distance between the point of connection to the concave peripheral wall 6 of the base 4 and the furthest point radially and transversely of said shoulder 9, meaning the tubular peripheral wall 8, is between 0.5 and 2.5 mm for a container diameter ranging between, for example, 50 to 120 mm.

This depth P of the shoulder 9 can also be between 0.5 and 2%, preferably between 1 and 1.5% and particularly 1.2%, of the diameter of the annular region 7, in the lower portion of the tubular body 3 of the container, depending on the type and nature of said container.

As is shown in FIG. 2, this depth P of the shoulder 9 corresponds to the difference between the radius $Rc$ of the tubular peripheral wall 8 and the radius $Rf$ of the concave peripheral wall 6 at its upper end, at said shoulder 9.

Although the peripheral wall 6 of the base 4 is generally concave in shape, this wall 6 can have a profile with several different radii of curvature; the mean radius $Rp$ of curvature of this concave peripheral wall 6 is advantageously between 5 and 20 mm.

Preferably, the height $H$ of the concave peripheral wall 6 of the base 4 is between 5 and 15 mm; this height $H$ is measured between the central portion 5 of the base 4 and the region where the shoulder 9 and said base 4 connect.

The container 1 as described above is of the type that holds between 0.2 and 2 liters, or even up to 4 liters, it being understood that the values of the mean radius $R$ of curvature of the concave peripheral wall 6, this concave peripheral wall 6 being of height $H$ and the shoulder 9 of depth $P$, can be partially dependent on the capacity (volume) of the molded container 1.

Preferably, the tubular peripheral wall 8 of the annular region 7 is substantially cylindrical in shape, in an extension of the body 3 as mentioned above; however, this tubular peripheral wall 8 can also be prismatic in shape with multiple facets.

The container 1 as described above is therefore obtained by means of a mold, not represented, which is part of the invention, said mold comprising different elements constituting a cavity that enables the shaping of the different parts of said container, meaning the bottom 2 and the body 3 of the container, said cavity comprising in particular an impression of the base which corresponds to the base 4 of said container, an impression of the annular region which corresponds to the annular region 7 of said container, and an impression of the shoulder which corresponds to the shoulder 9 of said container 1; these different elements of the mold cavity are represented in FIGS. 2 to 4.

In a first embodiment, the mold is simply composed of two mold halves which are used to shape the bottom 2 and the body 3 of the container.

In a variation, the mold is composed of two mold halves and a mold bottom. Depending on the complexity of the bottom 2 of the container, either the mold halves provide the impression for the body 3 of said container and the mold bottom provides the impression for said bottom 2 of the container, including the base 4, the annular region 7, and the shoulder 9 between said base 4 and said annular region 7, or the mold bottom provides an impression for only a portion of the bottom 2 of the container, for example the base or a portion of the base, or the base and the shoulder, and the mold halves then provide impressions for the body 3 of the container and the portion of the container bottom 2 not contained in said mold bottom.

In this mold, the impression for the base has a central portion corresponding to the central portion 5 of the base of said container 1, and an impression for the concave peripheral wall which corresponds to the concave peripheral wall 8 of said container, said impression for said concave peripheral wall having a concavity oriented towards the interior of the mold, and this impression for the concave peripheral wall extending substantially coaxially to the axis of said mold, said concavity defining a non-zero curvature at all points along said impression for said concave peripheral wall.

The impression for the annular region of the mold, situated above the impression for the base, forms a tubular peripheral wall impression which is situated in an extension of at least the tubular lower portion of the mold which corresponds to the impression for the tubular body 3 of the container 1.

The mold further comprises an impression for the shoulder which forms a connecting region between the impression for the base and the impression for the annular region.

The radial distance between the axis of the mold and the tubular peripheral wall of the annular region is greater than the radial distance between said axis and any point on said concave peripheral wall of the base.

The mold impression for the shoulder, situated between the base and the annular region, has a concavity of a profile characterized by a non-zero curvature in order to obtain a container 1 having a bottom 2 as represented in FIG. 2.

In one variation, the impression for the shoulder between the base and the annular region of the mold can comprise at least one substantially rectilinear wall transverse to the axis of the mold, as well as a substantially rectilinear wall parallel to said axis, in order to obtain a container 1 that has a bottom 2 of the shape illustrated in FIG. 3.

In another embodiment, the impression for the shoulder situated between the base and the annular region of the mold comprises at least one wall inclined relative to the axis of said mold so as to obtain a container 1 that has a bottom 2 corresponding to the one represented in FIG. 4.

The depth P of the impression for the shoulder, in the mold, is for example on the order of 0.5 to 2%, preferably 1 to 1.5% and particularly 1.2%, of the diameter of the annular region 7, in the lower portion of the tubular body 3 of the container 1, for containers that have a volume, for example, of between 0.2 and 2 liters or even up to 4 liters.

This depth P of the mold shoulder impression can also be between 0.5 and 2.5 mm for containers 1 for which the diameter of the tubular body is on the order of 50 to 120 mm.

The mean radius Rp of curvature for the base of the mold, for the concave peripheral wall, can be between 5 and 20 mm. This radius Rp of curvature can also be variable between the base itself and the shoulder.

The height H of the peripheral wall of the base of the mold bottom is for example between 5 and 15 mm.

The parting line between the mold bottom and the two mold halves can be placed at the connection between the base and the shoulder, but it can also be placed in the annular region, at any point in said region from the shoulder up to a level which corresponds to the lower portion of the tubular body of the mold and of the container 1.

The invention claimed is:

1. A container obtained by stretch-blow molding a preform of thermoplastic material, wherein the container is a bottle, comprising:
    a bottom; and
    a tubular body mounted to the bottom;
    the bottom including:
        a base having a central portion and a peripheral wall with a concavity oriented towards an interior of said container, said concave peripheral wall extending substantially coaxially to an axis X-X' of said container, and said concavity defining a non-zero curvature at all points along said concave peripheral wall;
        an annular region disposed above said base, forming a tubular peripheral wall, the tubular peripheral wall being cylindrical or prismatic with multiple facets, said annular region extending from a lower portion of said tubular body;
        a radial distance between said axis X-X' and said tubular peripheral wall being greater than the radial distance between said axis X-X' and any point on said concave peripheral wall of said base; and
        a shoulder provided between the base and the annular region, forming a connecting region in a form of an acute angle intersection between said base and said annular region.

2. A container according to claim 1, wherein the shoulder has a concavity defining a non-zero curvature at all points along on its profile.

3. A container according to claim 1, wherein the shoulder comprises at least one substantially rectilinear wall transverse to the axis X-X', as well as at least one substantially rectilinear wall parallel to the axis of said container, corresponding to the tubular peripheral wall.

4. A container according to claim 1, wherein the shoulder comprises at least one wall that is inclined relative to the axis X-X'.

5. A container according to claim 1, wherein a depth of the shoulder is 0.5 to 2%, preferably 1 to 1.5% and in particular 1.2%, of a diameter of the annular region.

6. A container according to claim 1, wherein a depth of the shoulder is between 0.5 and 2.5 mm for a container for which a diameter of the lower portion of the tubular body is between 50 and 120 mm.

7. A container according to claim 1, wherein a mean radius of curvature of the concave peripheral wall of the base is between 5 and 20 mm.

8. A container according to claim 1, wherein a radius of curvature of the concave peripheral wall of the base is variable between the central portion of said base and the shoulder.

9. A container according to claim 1, wherein a height of the concave peripheral wall of the base is between 5 and 15 mm.

10. A mold for forming a container obtained by stretch-blow molding a preform of thermoplastic material, said mold comprising different elements that define a cavity for forming different parts of the container, including a bottom of said container and a tubular body of said container, wherein said container is a bottle, said cavity comprising:
    an impression for a base having a central portion and a concave peripheral wall with a concavity oriented towards an interior of said container, said concave peripheral wall extending substantially coaxially to an axis of said mold, said concavity defining a non-zero curvature at all points along said concave peripheral wall,
    an impression for an annular region disposed above said base, forming a tubular peripheral wall, the tubular peripheral wall being parallel to the axis of the mold, said annular region extending from a lower portion of an impression for the tubular body,
    a radial distance between the axis of said mold and said tubular peripheral wall being greater than a radial distance between said axis and any point on said concave peripheral wall of the impression for said base, and
    an impression for a shoulder provided between the base and the annular region, forming a connection region in a form of an acute angle intersection between said base and said annular region.

11. A mold according to claim 10, wherein the impression for the shoulder has a concavity defining a non-zero curvature at all points along its profile.

12. A mold according to claim 10, wherein the impression for the shoulder comprises at least one substantially rectilinear wall transverse to the axis of said mold, as well as at least one substantially rectilinear wall parallel to the axis of said mold.

13. A mold according to claim 10, wherein the impression for the shoulder comprises at least one wall that is inclined relative to the axis of said mold.

14. A mold according to claim 10, wherein a depth of the impression for the shoulder is 0.5 to 2%, preferably 1 to 1.5% and in particular 1.2%, of a diameter of the annular region.

15. A mold according to claim 10, wherein a depth of the impression for the shoulder is between 0.5 and 2.5 mm for a mold for which an inside diameter of the lower portion of the impression for the tubular body is between 50 and 120 mm.

16. A mold according to claim 10, wherein a mean radius of curvature of the concave peripheral wall of the impression for the base is between 5 and 20 mm.

17. A mold according to claim 10, wherein a radius of curvature of the peripheral wall of the impression for the base is variable between the base itself and the shoulder.

18. A mold according to claim 10, wherein a height of the peripheral wall of the impression for the base is between 5 and 15 mm.

* * * * *